Patented Sept. 2, 1952

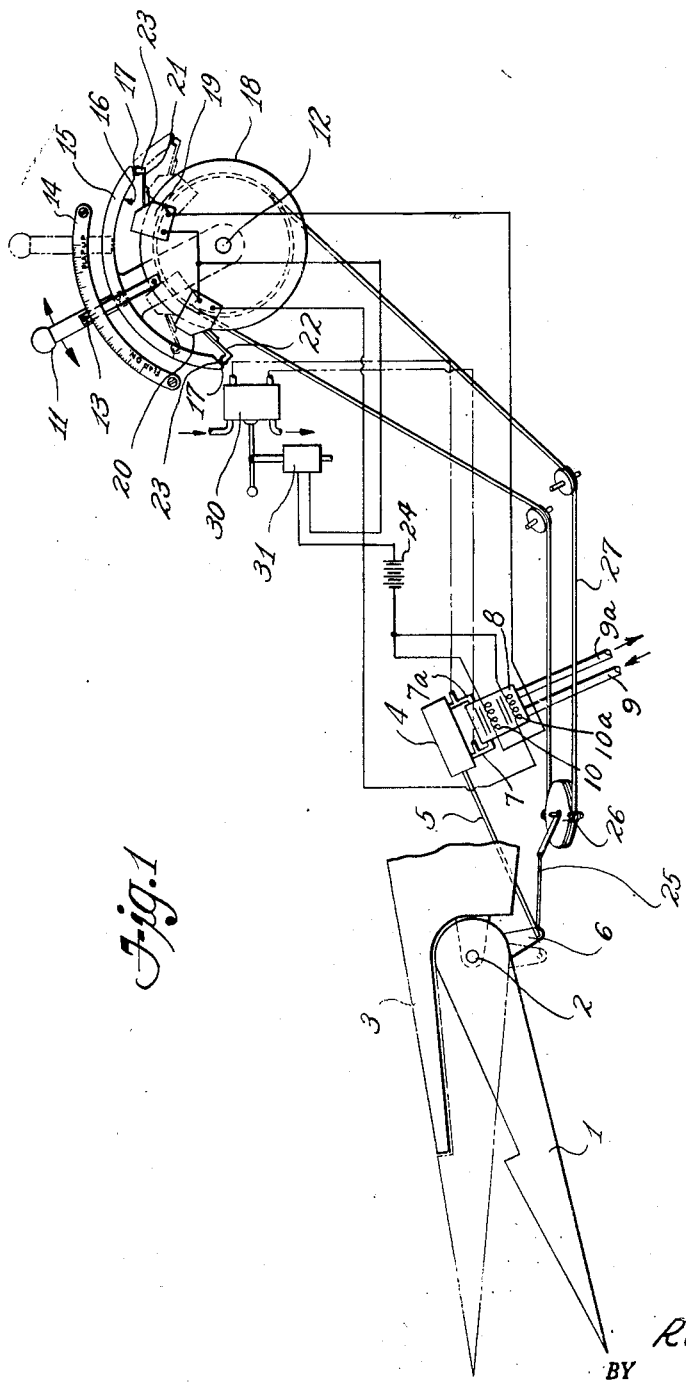

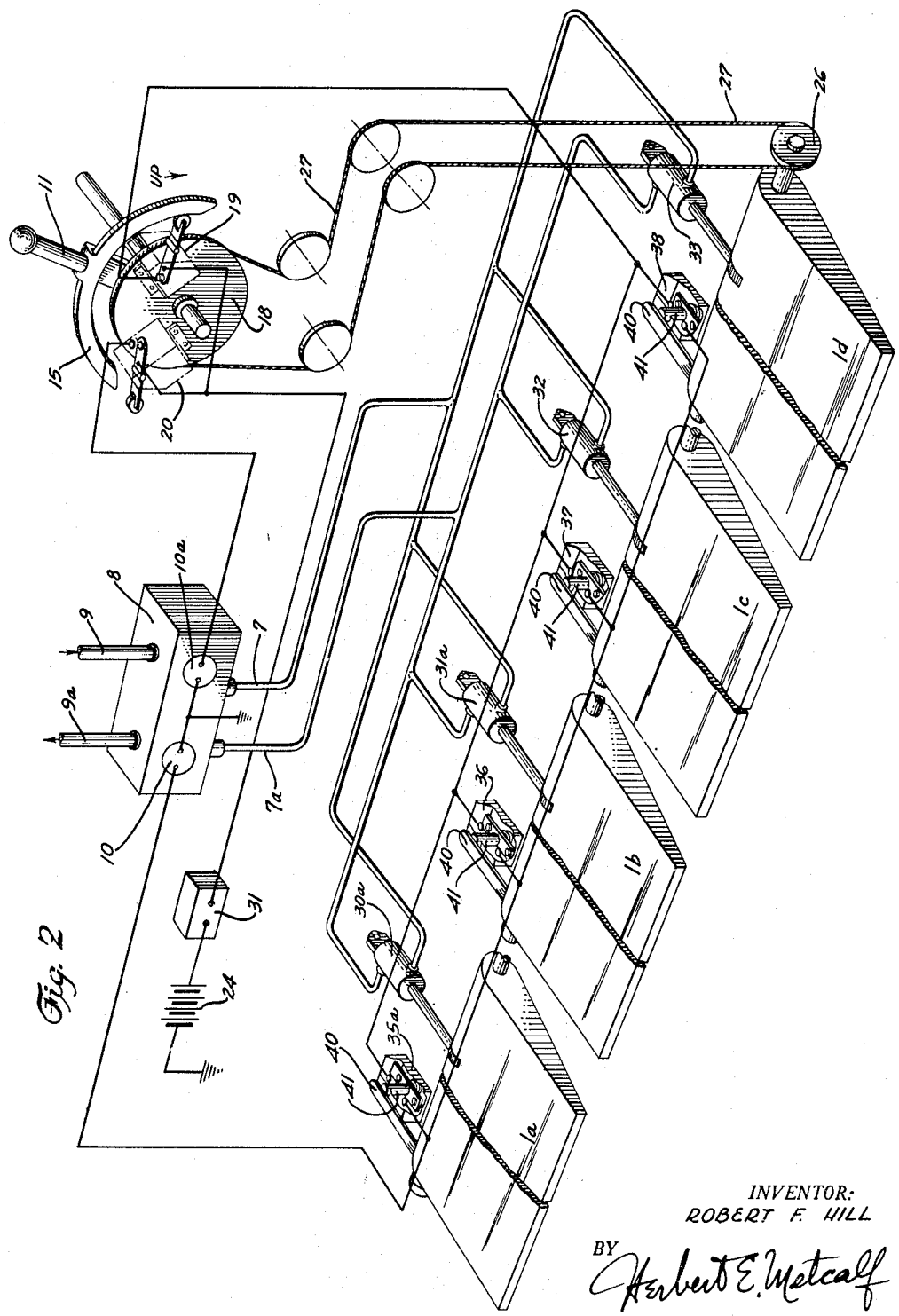

2,609,165

UNITED STATES PATENT OFFICE 2,609,165

FLAP POSITIONING CONTROL SYSTEM

Robert F. Hill, Hawthorne, Calif., assignor to Northrop Aircraft, Inc., Hawthorne, Calif., a corporation of California Application January 20, 1948, Serial No. 3,192

5 Claims. (Cl. 244—42)

The present invention relates to airplane flap controls and more particularly to a power operated flap control whereby the pilot of an airplane can position the flap to an exact angle with minimum attention.

It is customary on high speed airplanes for the high lift flaps, for example, to be power operated, and to be moved slowly downwardly by a switch or like control operated by the pilot. The angle attained by the flap is a function of time, and the pilot must watch a flap position indicator operated by the flap to determine when the proper flap angle has been reached. The present invention provides a flap operating lever or control element which can be moved by the pilot to a predetermined angle from a reference point, and the flap then automatically assumes under power the same or a directly related angle so that the pilot does not have to wait or watch to see what angle the flap is assuming.

It is to be noted that such high lift flaps are customarily set at different angles for take-off and for landing, and also at different angles during landing, when the flap is usually moved from the optimum lift drag ratio position, to the optimum braking condition as landing takes place. As the pilot is often exceptionally occupied with other matters during this extremely important period, a simple means and method whereby the pilot can set the exact flap angle into the flap actuating device with the knowledge that the flap will assume that angle, is an important safety factor in airplane operation.

It is, therefore, an object of the invention to provide a means and method of exactly controlling the angle a power operated flap will assume, prior to the flap reaching that position.

My invention, with its further advantages and objects, can be more fully understood by reference to the accompanying drawings, wherein:

Figure 1 is a diagrammatic elevation view showing an aircraft surface connected to be operated by a preferred form of the present invention.

Figure 2 is a diagrammatic perspective view showing four surfaces connected in accordance with a further embodiment of this invention.

In Figure 1 a trailing edge flap 1 is mounted for movement downwardly on an axle 2, supported by a wing panel 3 for example. Under these conditions flap 1 may be used to provide increased lift for take-off and landing when moved.

Flap 1 may be actuated for example, by a hydraulic motor having a fixed cylinder 4 and a piston rod 5 connected to a lever 6 on flap 1.

Cylinder 4 is provided with a flexible flap down line 7 and a flexible flap up line 7a which alternately act as pressure and return lines for hydraulic fluid. These lines lead from an electrically operated flap control valve 8 mounted in the structure of the wing 3 near the cylinder 4. The flap control valve 8 has two supply ports for connection to a fluid inlet 9 and a fluid outlet 9a which come from the airplane's hydraulic system. Inside the control valve 8, a flap up solenoid 10 and a flap down solenoid 10a control its operation. Normally, when both solenoids are deenergized, the control valve 8 is spring-urged to a neutral position, closed to both flap down line 7 and flap up line 7a. When the flap up solenoid 10 is energized, the valve moves to supply pressure from the fluid inlet 9 to the flap up line 7a and open the flap down line 7 to the fluid outlet 9a. When the flap down solenoid 10a is energized, instead of the first, the valve moves to supply pressure from the fluid inlet 9 to the flap down line 7 and open the flap up line 7a to the fluid outlet 9a. Solenoid operated valves such as this are well known to those skilled in the art. Operation of the respective solenoids thus controls the directional response of the hydraulic motor, and with both solenoids deenergized, the motor and the flap are locked in position.

In the pilot's cockpit a flap control mechanism is utilized, preferably positioned so that an operating lever 11 moves in the same direction as the desired flap movement. Lever 11 is mounted on an axle 12 and carries a cam 15 having an internal arcuate surface 16 centered at the axis of axle 12. Cam 15 is also provided with bevelled ends. Also rotatably mounted on axle 12 is a drum 18 having a pair of electrical switches 19 and 20 mounted thereon, these switches having actuating members 21 and 22 respectively thereon, the end rollers 23 members describing coextensive arcuate paths also centered on the axis of axle 12. Drum 18 carries an index 13 moving over a scale 14 preferably graduated in degrees.

The ends of actuating members 21 and 22 are arcuately spaced so that both rollers 23 rest on the bevelled ends of the cam so that both switches are normally held open.

One switch 19 is electrically connected to the flap up solenoid 10 through power source 24, and when closed operates this solenoid to cause the flap to move upwardly. The other switch 20 is electrically connected also through power source 24 to the flap down solenoid 10a to cause the flap to move in the opposite direction when closed.

Motion of the flap is fed back to the flap control mechanism, for example, as by a lever linkage 25 rotating a pulley 26 driving a cable 27 eventually passing around drum 18, to rotate it in accordance with flap movement.

In operation, lever 11 is moved by the pilot to the angular position he desires the flap to assume. This action closes the switch 19 or 20 toward which movement is made, leaving the other switch open. The flap then starts to move in the proper direction, and the drum carrying the switches is rotated by the flap until both rollers 23 again rest on bevelled ends of the cam. Both switches are then again open and the flap stops in the desired angular position. The pilot does not need to watch an indicator and his attention can be directed to other matters. Lever adjustments can be made when desired with the complete assurance that the flap will assume the angle set into the system by lever movement.

The arrangement shown is readily adapted for manual override in case anything happens to the pilot's control mechanism. This may be done by utilizing a manual control comprising a pilot operated hydraulic valve 30 that can be moved in the proper direction to directly operate the hydraulic motor as desired. A disconnect switch 31 in the common lead from the power source 24 is opened by any departure of the valve 30 from center so that both of the hydraulic motor electrical solenoids 10 and 10a remain deenergized irrespective of the condition of switches 19 and 20. Under these conditions full manual control of the flap is obtained but without the automatic positioning feature described above.

While the present invention has been described as applied to the actuation of a high lift flap, it will be obvious to those skilled in the art that the invention can be applied to the position control of other type flaps, such as, for example, "trim flaps," and the like.

Often, however, it is desirable to operate multiple flaps each with its own hydraulic motor, with a feed back connection to the pilot's control mechanism from one flap only. Under these conditions, it has been found that the flap having the feed back connection may shut off the hydraulic motors before one or more of the remainder of the flaps have been fully normalized after being extended.

Such a condition can readily be avoided by use of the controls shown in Figure 2, wherein like numbers are given to parts corresponding to their equivalents in Figure 1. Here 4 flaps 1a, 1b, 1c, and 1d are to be used as landing flaps for example. Separate hydraulic operating motors are provided, a left outboard motor 30a, a left inboard motor 31a, a right inboard motor 32 and a right outboard motor 33. These motors are under the parallel control of the flap control valve 8, which is operated as usual by the flaps up solenoid 10 and flaps down solenoid 10a. Flaps down solenoid 10a is electrically direct connected to the flaps down switch 20 so that all flaps move downwardly together when switch 20 is closed. Flaps up solenoid 10, however, is connected to flaps up switch 19 through four limit switches, i. e., a left outboard flap switch 35a, a left inboard flap switch 36, a right inboard flap switch 37 and a right outboard flap switch 38 all in parallel and arranged to be closed when the flaps move away from full up position, and opened in full up position. The limit switches are spring-loaded to the closed position and will be pushed to the open position, as each respective flap reaches its full up position, by a striker 40 attached to rotate with each flap and contact a switch plunger 41. This circuit through the switches 35a, 36, 37 and 38 is not opened until all of the flaps are completely up. In addition, the drum 18 is connected to the follow-up flap 1d so that when all of the flap limit switches are opened by the flaps being completely up, the flaps up switch 19 is still closed, by still being on the cam 15, but in position so that when the cam 15 is moved to close the flaps down switch 20, the flaps up switch opens as limit switches 35a, 36, 37, and 38 close due to the flaps moving downwardly. Thus the switch conditions shown in Figure 2 is that for all flaps being completely up.

What is claimed is:

1. In an airplane, a plurality of flaps to be moved through a range of positions, a reversible flap actuating motor for each flap, a pilot moved control member, a follow-up member moved by one of said flaps only, a pair of direction switches cooperating with said members and with said actuating motors to actuate said motors by movement of said control member to move said flaps to positions directly related to the amount of movement of said control member, a limit switch positioned at each flap to be opened only when its respective flap is in a predetermined position, said predetermined position being at one extremity of said range of positions just short of the position normally called for by one of said direction switches at one end position of said control member, said limit switches being connected in parallel with each other and in series with said one direction switch to open said series circuit while said one direction switch is still closed, whereby all of said flaps will reach said predetermined position before said flap actuating motors are deenergized, a pointer attached to said follow-up member, and calibrated scale means associated with said control member and said pointer to indicate the actual position of the flap connected to said follow-up member at all times.

2. In an airplane, a plurality of flaps to be moved through a range of positions, a reversible flap actuating motor for each flap, a pilot moved control member, a follow-up member moved by one of said flaps only, a pair of direction switches cooperating with said members and said actuating motors to actuate said motors by movement of said control member to move said flaps to positions directly related to the amount of movement of said control member, a limit switch positioned at each flap to be opened only when its respective flap is in a predetermined position, said predetermined position being at one extremity of said range of positions just short of the position normally called for by one of said direction switches at one end position of said control member, said limit switches being connected in parallel with each other and in series with said one direction switch to open said series circuit while said one direction switch is still closed, whereby all of said flaps will reach said predetermined position before said flap actuating motors are deenergized.

3. In an airplane, a plurality of flaps to be moved to desired positions, a reversible flap actuating motor for each flap, a first direction switch connected to operate all of said motors in one direction, a second direction switch connected to operate all of said motors in the opposite direction, a first rotatable member, spaced switch actuating means mounted on said first rotatable member to describe coextensive arcuate paths, a second rotatable member, an arcuate cam positioned on said second rotatable member to describe a second arcuate path on a common center with that of said first arcuate paths, said cam being shaped and positioned to hold both switches open by opposite end contacts with said switch actuating means and to close one switch only when moved in either direction, one of said rotatable members being movable by the pilot of said airplane and the other rotatable member being connected to rotate in accordance with the position of one of said flaps only, and a limit switch positioned at each flap to be opened only when its respective flap is in a predetermined position, said predetermined position being at one extremity of said desired positions just short of the position where said switch actuating means is set to open one of said direction switches at one end position of said pilot-moved rotatable member, said limit switches being connected in parallel with each other and in series with said one direction switch to open said series circuit while said one direction switch is still closed, whereby all of said flaps will reach said predetermined position before said flap actuating motors are deenergized.

4. In an airplane, a plurality of flaps to be moved from a predetermined flight position downwardly to various lift increasing positions and upwardly back to said predetermined flight position, a reversible flap actuating motor for each flap, a pilot moved control member, a follow-up member moved by one of said flaps only, a flaps-up switch and a flaps-down switch cooperating with said members and said actuating motors to actuate said motors by movement of said control member to move said flaps to positions directly related to the amount of movement of said control member and then shut off said motors by movement of said follow-up member, a limit switch positioned at each flap to be opened only when its respective flap is in said predetermined flight position, said flight position being just lower than the flaps-up switch shut-off position when said pilot-moved control member is in the extreme flaps-up-position, said limit switches being connected in parallel with each other and in series with said flaps-up switch to open said series circuit while said flaps-up switch is still closed, whereby all of said flaps will rise to said predetermined flight position before said flap actuating motors are deenergized.

5. In an airplane, a plurality of flaps movable downwardly from a normal flight position and upwardly back to said position, a reversible motor for each flap, a pilot operated flaps-down switch connected to energize all of said motors to move said flaps downwardly, a pilot operated flaps-up switch connected to energize all of said motors to move said flaps upwardly, a limit switch positioned at each flap to be opened only when its respective flap is in said normal flight position, said limit switches being connected in parallel with each other and in series with said flaps-up switch to open said series circuit upon upward movement of said flaps to said flight position while said flaps-up switch is still closed, whereby said flap actuating motors are automatically deenergized after all of said flaps reach said normal flight position.

ROBERT F. HILL.

REFERENCES CITED

The following references are of record in the file of this patent:

UNITED STATES PATENTS

| Number | Name | Date |
|---|---|---|
| 1,887,335 | Sperry | Nov. 8, 1932 |
| 2,191,792 | Hill | Feb. 27, 1940 |
| 2,262,173 | Fischer | Nov. 11, 1941 |
| 2,355,587 | Reeves | Aug. 8, 1944 |
| 2,390,425 | Crum | Dec. 4, 1945 |
| 2,443,809 | Terbeek | June 22, 1948 |
| 2,480,334 | Melrose | Aug. 30, 1949 |

FOREIGN PATENTS

| Number | Country | Date |
|---|---|---|
| 711,002 | France | June 16, 1931 |
| 659,887 | Germany | May 12, 1938 |